(12) United States Patent
Brown

(10) Patent No.: US 9,010,646 B2
(45) Date of Patent: Apr. 21, 2015

(54) OPTICAL CONTACT LOADED MAGNETIC CARD

(75) Inventor: Kerry D. Brown, Portola Valley, CA (US)

(73) Assignee: Coin, Inc., San Francisco, CA (US)

(*) Notice: Subject to any disclaimer, the term of this patent is extended or adjusted under 35 U.S.C. 154(b) by 112 days.

(21) Appl. No.: 13/225,188

(22) Filed: Sep. 2, 2011

(65) Prior Publication Data

US 2011/0320314 A1 Dec. 29, 2011

Related U.S. Application Data

(63) Continuation-in-part of application No. 12/752,390, filed on Apr. 1, 2010.

(51) Int. Cl.
| | |
|---|---|
| *G06K 5/00* | (2006.01) |
| *G06K 19/06* | (2006.01) |
| *G06Q 30/06* | (2012.01) |
| *G06K 19/07* | (2006.01) |

(52) U.S. Cl.
CPC ...... *G06Q 30/0613* (2013.01); *G06K 19/06206* (2013.01); *G06K 19/0728* (2013.01)

(58) Field of Classification Search
CPC ... G06Q 30/02; G06Q 50/12; G06Q 30/0613; G06F 17/30265; G06F 17/30277; G06F 17/30876; G06K 19/06206; G06K 19/0728; G07F 17/32; G07F 17/3218; G07F 17/3223; G07F 17/3286
USPC .......... 235/462.06, 380, 493, 462.01
See application file for complete search history.

(56) References Cited

U.S. PATENT DOCUMENTS

| | | | |
|---|---|---|---|
| 3,978,524 A | 8/1976 | Gordon et al. | |
| 4,605,844 A | 8/1986 | Haggan | |
| 4,701,601 A | 10/1987 | Francini et al. | |
| 4,734,897 A | 3/1988 | Schotz | |
| 4,791,283 A | 12/1988 | Burkhardt | |

(Continued)

FOREIGN PATENT DOCUMENTS

| | | |
|---|---|---|
| WO | 0021020 | 4/2000 |
| WO | 0247019 | 6/2002 |
| WO | 2013068768 | 5/2013 |

OTHER PUBLICATIONS

Office Action for U.S. Appl. No. 12/752,390, dated Mar. 30, 2012, 85 pages.

(Continued)

*Primary Examiner* — Thien T Mai
(74) *Attorney, Agent, or Firm* — Amin, Turocy & Watson, LLP; Daniel W. Bedell

(57) ABSTRACT

A magnetic interface card appears to be a payment card conventionally provided with an electromagnetic stripe and magnetic data tracks. A magnetic emissive element is disposed in the magnetic interface card body under the magnetic data tracks that can emit a variety of ISO-7813 track-2 data strings. A photo-sensor is included to receive a series of optically encoded flashes from a personal trusted device (PTD) smartphone screen that securely communicate one-time-use account information and operational parameters from a financial transaction server. The large installed base of legacy point-of-sale magnetic card readers can continue to be used without any hardware or software modifications, and card security is improved by the change to one-time-use access numbers.

6 Claims, 8 Drawing Sheets

(56) References Cited

U.S. PATENT DOCUMENTS

| | | |
|---|---|---|
| 5,307,326 A | 4/1994 | Osawa |
| 5,434,398 A | 7/1995 | Goldberg |
| 5,535,078 A | 7/1996 | Warwick |
| 5,834,747 A | 11/1998 | Cooper |
| 5,834,756 A | 11/1998 | Gutman et al. |
| 5,910,866 A | 6/1999 | Shiomoto |
| 6,058,319 A | 5/2000 | Sadler |
| 6,308,890 B1 | 10/2001 | Cooper |
| 6,510,983 B2 | 1/2003 | Horowitz et al. |
| 6,607,127 B2 | 8/2003 | Wong |
| 6,764,005 B2 | 7/2004 | Cooper |
| 6,769,607 B1 | 8/2004 | Pitroda et al. |
| 6,811,082 B2 | 11/2004 | Wong |
| 7,028,897 B2 | 4/2006 | Fernandes et al. |
| 7,114,652 B2 | 10/2006 | Moullette et al. |
| 7,127,236 B2 | 10/2006 | Khan et al. |
| 7,252,232 B2 | 8/2007 | Fernandes et al. |
| 7,357,319 B1 | 4/2008 | Liu et al. |
| 7,364,092 B2 | 4/2008 | Narendra et al. |
| 7,376,433 B1 | 5/2008 | Hose |
| 7,483,858 B2 | 1/2009 | Foran et al. |
| 7,711,100 B2 | 5/2010 | Dennis |
| 8,074,877 B2 | 12/2011 | Mullen et al. |
| 2002/0190121 A1* | 12/2002 | Walker et al. .............. 235/380 |
| 2004/0026506 A1* | 2/2004 | Finkelstein ................ 235/493 |
| 2004/0177045 A1 | 9/2004 | Brown |
| 2005/0194452 A1 | 9/2005 | Nordentoft et al. |
| 2006/0000891 A1 | 1/2006 | Bonalle et al. |
| 2006/0023218 A1* | 2/2006 | Jung et al. ............ 235/462.06 |
| 2007/0007348 A1 | 1/2007 | Shah |
| 2007/0044139 A1 | 2/2007 | Tuyls et al. |
| 2007/0189581 A1 | 8/2007 | Nordentoft et al. |
| 2007/0241183 A1 | 10/2007 | Brown et al. |
| 2008/0173717 A1 | 7/2008 | Antebi et al. |
| 2008/0191009 A1 | 8/2008 | Gressel et al. |
| 2008/0307515 A1 | 12/2008 | Drokov et al. |
| 2009/0037275 A1 | 2/2009 | Pollio |
| 2009/0145964 A1* | 6/2009 | Blythe ........................ 235/380 |
| 2009/0159670 A1* | 6/2009 | Mullen et al. .............. 235/380 |
| 2009/0159700 A1* | 6/2009 | Mullen et al. .............. 235/493 |
| 2009/0310779 A1 | 12/2009 | Lam et al. |
| 2010/0031173 A1* | 2/2010 | Djemal ........................ 715/764 |
| 2010/0044444 A1 | 2/2010 | Jain et al. |
| 2010/0219234 A1 | 9/2010 | Forbes |
| 2010/0320266 A1 | 12/2010 | White |
| 2010/0328032 A1 | 12/2010 | Rofougaran |
| 2011/0251892 A1 | 10/2011 | Laracey |
| 2013/0153655 A1 | 6/2013 | Dawkins |
| 2013/0256421 A1 | 10/2013 | Johnson et al. |
| 2014/0108263 A1 | 4/2014 | Ortiz et al. |
| 2014/0149285 A1 | 5/2014 | De et al. |

OTHER PUBLICATIONS

Office Action for U.S. Appl. No. 12/752,390, dated Nov. 5, 2012, 12 pages.

Office Action for U.S. Appl. No. 12/752,390, dated Feb. 21, 2014, 10 pages.

Corcoran, J., "Partnering for Profit: 2 Types of Mobile Payments," Fortress Mobile Payments, A Power Point Presentation, c. 2013, 7 pages.

"Intelligent Mobile Payments," Fortress Payments, Jan. 11, 2013, 1 page.

"Intelligent Mobile Payments: QR Codes," Fortress Payments, Mar. 15, 2013, 2 pages.

"Mobile QR Code/NFC/WiFi Payments Patent," Mobile Patent Outline, A characterization of US Patent 7,483,858, Apr. 2013, PDF file creation Apr. 26, 2013 by Joseph Corcoran., 3 pages.

Corcoran, J., "Types of QR Codes Used in Payments," Fortress Payments, Briefing Paper, Jul. 2013, 20 pages.

Gao, J. et al., "A 2D Barcode-Based Mobile Payment System," Multimedia and Ubiquitous Engineering, 2009, MUE '09, Third International Conference on, IEEE, Piscataway, NJ, USA, Jun. 4, 2009, pp. 320-329.

Office Action for U.S. Appl. No. 12/752,390, dated Sep. 23, 2014, 20 pages.

Notice of Allowance for U.S. Appl. No. 12/752,390, dated Dec. 5, 2014, 14 pages.

Office Action for U.S. Appl. No. 14/098,840, dated Oct. 10, 2014, 30 pages.

* cited by examiner

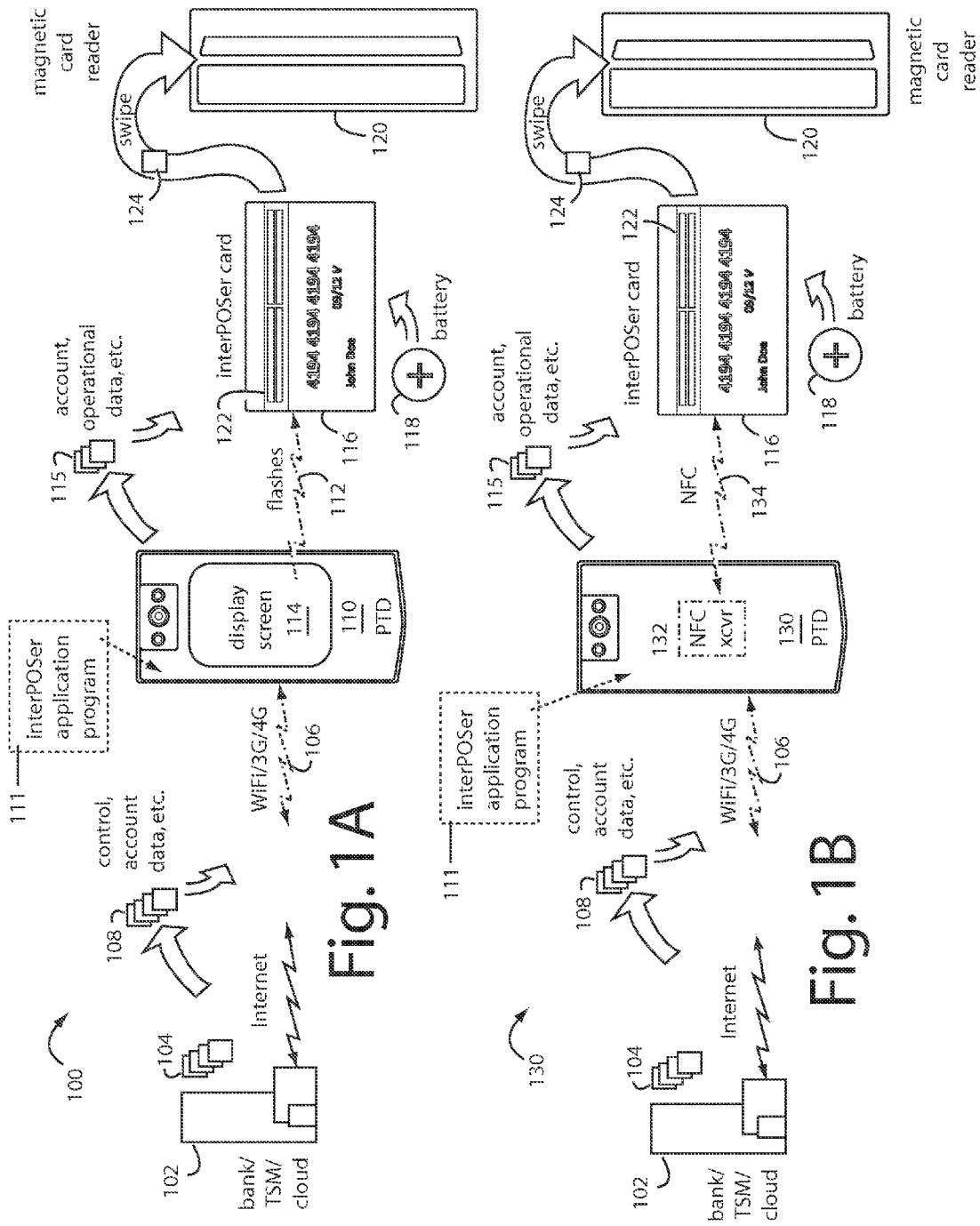

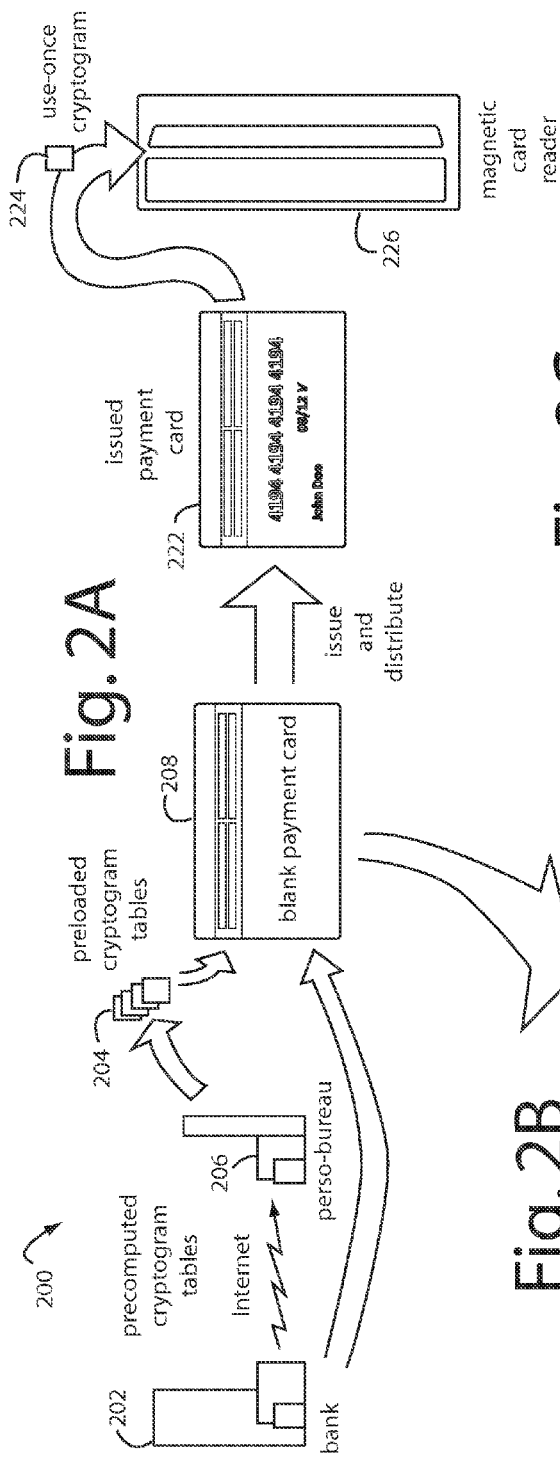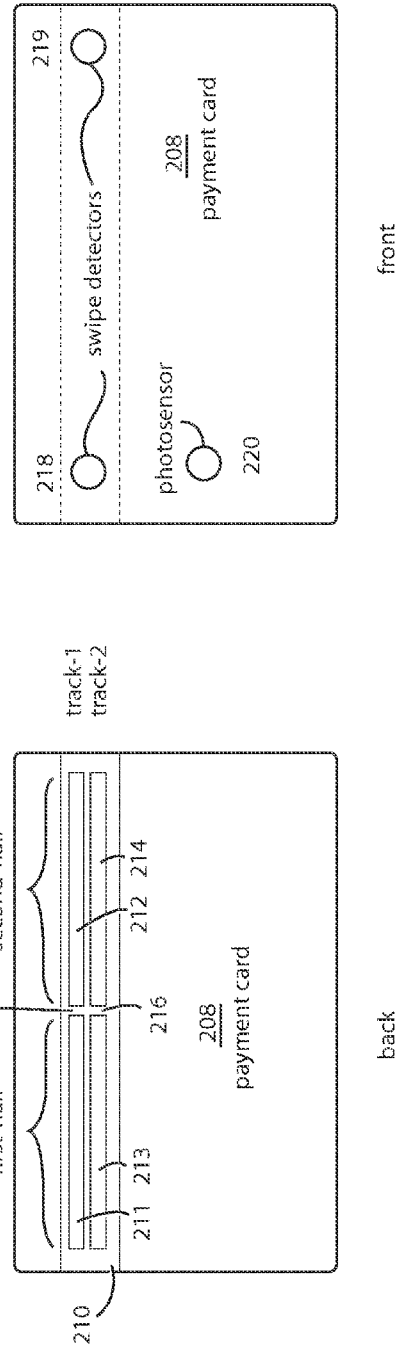

OPTICAL CONTACT LOADED MAGNETIC CARD

COPENDING APPLICATION

This application is a Continuation-in-Part of U.S. patent application Ser. No. 12/752,390, filed Apr. 1, 2010, and titled MAGNETIC EMISSIVE USE OF PRELOADED SECRET-KEY ENCRYPTED USE-ONCE PAYMENT CARD ACCOUNT NUMBERS, by the present inventor, Kerry D. Brown.

BACKGROUND OF THE INVENTION

1. Field of the Invention

The present invention relates to magnetic track payment cards compatible with existing point-of-sale card readers, and more particularly to payment cards that can receive account security data optically from user smartphones and laptops and use it to magnetically output ISO-7813 track data.

2. Description of Related Art

Conventional credit cards, debit cards, and other payment cards use a single account number that is open for all to see (and duplicate). Any fraudster that has been handed the magnetic interface card, read it, or otherwise managed to record the account number had little trouble in running charges up against the account. So merchants and banks started requiring identification, billing addresses, expiration dates, holograms, signature panels, and now security codes before completing a transaction. But loose enforcement of these measures has not really put much of an obstacle in the fraudsters' paths.

Use-once account numbers are an excellent way to control these types of fraud, but the use-once number needs to be magnetically readable by a legacy card reader or presented on a user display. These both require the inclusion of active electronics in the magnetic interface cards that raises the unit costs of the magnetic interface cards themselves and that often depend on batteries for their continued operation.

The technology required to put dynamic electromagnetic stripes on payment cards is very challenging. It would be desirable to have all the bits in every magnetic data track be programmable by the magnetic interface card itself so the use-once account numbers could be freely updated. Current magnetic device technology is further not up to the challenge of the high bit recording densities needed on track-1 of the typical payment card at a cost acceptable to the card issuers and payment associations.

User account data is recorded on the electromagnetic stripes of conventional payment cards using industry-standard formats and encoding like ISO-7810, ISO-7811(–1:6), and ISO-7813, available from American National Standards Institute (NYC, N.Y.). Such standards specify the physical characteristics of the magnetic interface cards, how to do the embossing, the electromagnetic stripe media characteristics for low-coercivity, the permissible locations for any embossed characters, the location of data tracks 1-3, any high-coercivity electromagnetic stripe media characteristics, etc.

A typical Track-1, as defined by the International Air Transport Association (IATA), as being seventy-nine alpha-numeric 7-bit characters recorded at 210-bits-per-inch (bpi) with 7-bit encoding, Track-2, as defined by the American Bankers Association (ABA), is forty numeric characters at 75-bpi with 5-bit encoding, and Track-3 (ISO-4909) is typically one hundred and seven numeric characters at 210-bpi with 5-bit encoding. Each track includes starting and ending sentinels, and a longitudinal redundancy check character (LRC). The Track-1 format can include user primary account information, user name, expiration date, service code, and discretionary data. Conventional payment card magnetic tracks conform to the ISO/IEC Standards 7810, 7811-1-6, and 7813, and other formats.

The ISO 7810/7816 specifications and ABA/IATA stripe data fields describe a "discretionary field", and "other data field" that can be used exclusively for the issuing bank. The discretionary fields can be used for status bits and other operators.

Authentication factors are pieces of information that can be used to authenticate or verify the identity of a cardholder. Two-factor authentication employs two different authentication factors to increase the level of security beyond what is possible with only one of the constituents. For example, one kind of authentication factor can be what-you-have, such as electromagnetic stripe credit card or the SIM card typical to many mobile devices and personal trusted device (PTD). The second authentication factor can be what-you-know, such as the PIN code that you enter at an ATM machine. Using more than one authentication factor is sometimes called "strong authentication" or "multi-factor authentication," and generally requires the inclusion of at least one of a who-you-are or what-you-have authentication factor.

What is needed is a payment card that can magnetically provide use-once account numbers to legacy card readers. Especially payment cards that can receive card data updates from a PTD, in effect allowing the PTD to access ubiquitous magnetic-swipe point-of-sale (POS) terminals without actually having to modify the terminals themselves.

SUMMARY OF THE INVENTION

Briefly, a payment card embodiment of the present invention appears to be conventionally provided with an electromagnetic stripe and magnetic data tracks. A magnetic emissive element is disposed in the magnetic interface card body under the magnetic data tracks that can emit a variety of track data strings. A photo-sensor is included to receive a series of optically encoded flashes from a personal trusted device, such as smartphone screen, that securely communicate one-time-use account information and operational parameters from a financial transaction server. The large installed base of legacy point-of-sale magnetic card readers can continue to be used without any hardware or software modifications, and card security is improved by the change to one-time-use access numbers.

The above and still further objects, features, and advantages of the present invention will become apparent upon consideration of the following detailed description of specific embodiments thereof, especially when taken in conjunction with the accompanying drawings.

BRIEF DESCRIPTION OF THE DRAWINGS

FIGS. 1A and 1B are functional block diagrams of payment system embodiments of the present invention in which account and control data downloaded by a personal trusted device by optical, audio, or near field communication (NFC) wireless links;

FIGS. 2A-2C are a schematic diagram of a financial payment system embodiment of the present invention, and back and front views of a payment card that divides the magnetic data tracks into a first half and a second half to control inter-channel crosstalk. FIG. 2B illustrates the back of the payment card and shows how two magnetic data tracks can be divided into partial data tracks to control crosstalk. FIG. 2C illustrates the magnetic interface card front and shows a way to place two swipe sensors and a photosensor;

DETAILED DESCRIPTION OF THE INVENTION

Figure 3:
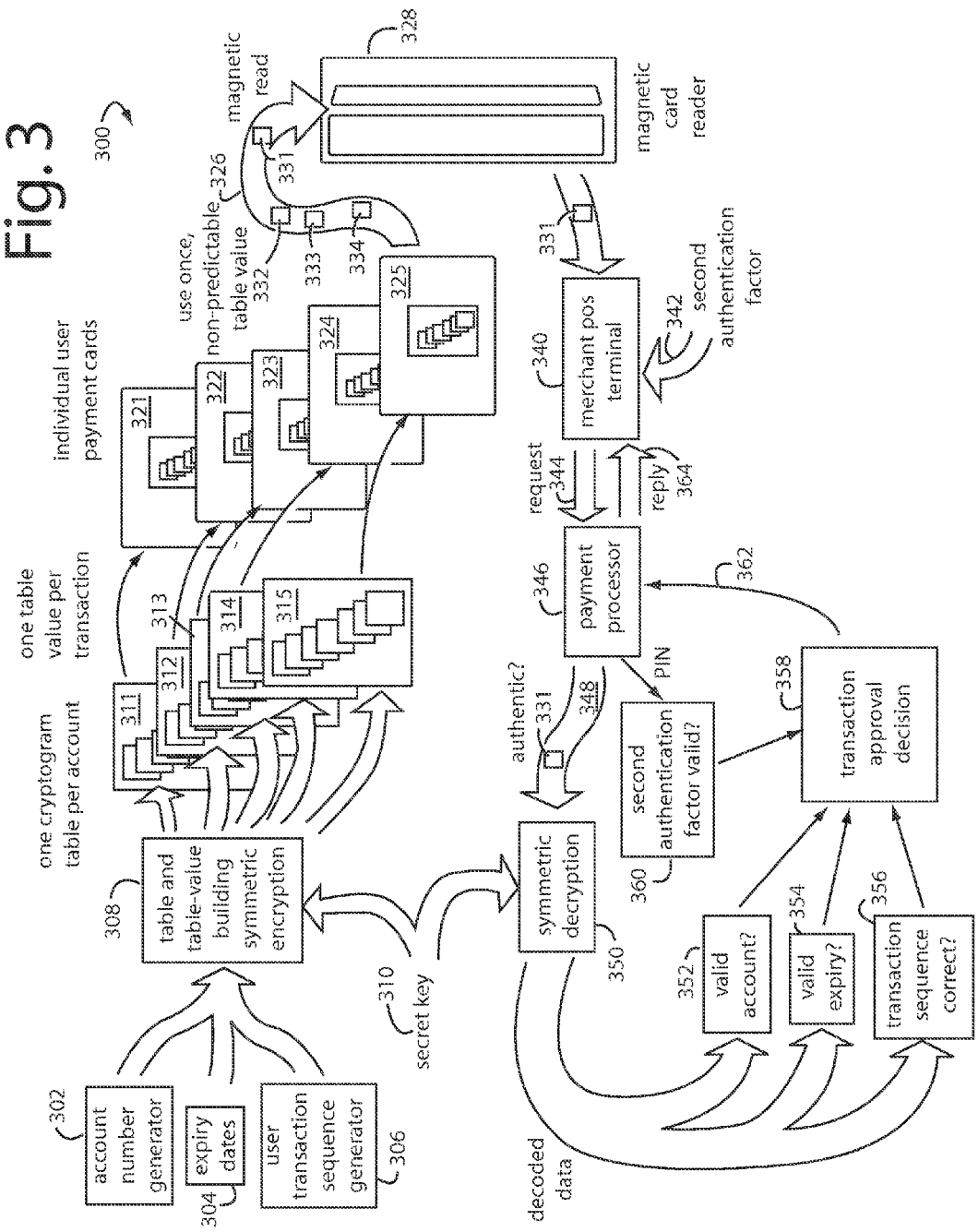
FIG. 3 is a flowchart diagram of financial payment system embodiment of the present invention that uses symmetric key encryption of account numbers, expiry numbers, and sequence numbers for use once cryptograms in payment cards.

Embodiments of the present invention provide an interface card that is used like a conventional credit or debit card in any magnetic card reader used by point-of-sale (POS) merchants throughout the world. These magnetic interface cards are trademarked by Cryptite, Inc. as INTERPOSER™ CARDS and give the appearance of being an ordinary payment card. They are periodically charged up with use-once account numbers by a smartphone or other personal trusted device (PTD) and fully autonomous thereafter.

In effect, such INTERPOSER cards extend the computing reach of a PTD to magnetic-swipe POS terminals and overcome the severe limitations of conventional magnetic cards caused by their fixed and unchangeable magnetic data payloads. The fixed nature of these conventional cards has been a serious security flaw. A complete system therefore comprises both the PTD and the INTERPOSER card.

FIG. 1A represents an improved payment system embodiment of the present invention, and is referred to herein by general reference numeral 100. System 100 uses a bank 102, trusted service manager (TSM), or other payment card issuer, to pre-compute user account numbers and corresponding cryptograms 104. These are encrypted, e.g., with a secret key using a symmetric-key algorithm. The secret keys are used by the bank's symmetric-key algorithms for both encrypting and decrypting partial or complete account numbers into corresponding cryptograms 104 that represent control and account data. The account data in corresponding cryptograms 104 are each typically used only once.

The Internet and a wireless connection 106, such as Wi-Fi/3G/4G, etc., are used to communicate control and account data 108 after being authenticated with a smartphone or other personal trusted device (PTD) 110. More than a user's ID and password can be used to authenticate PTD 110 to bank 102, the "IEM" or "UDID" serial number of a smartphone and the "SIM" card data can be included as well to strengthen security. The iPhone Unique Device Identifier (UDID) is a hash of several different hardware identifiers pulled from the chips on the phone. It's not a software-generated identifier for a software object. Colorgrams and other external tokens can also be effectively included.

Typical PTD's have enough processing power available to engage in strong authentication sessions. It's not practical to put such computing capabilities in a smartcard with today's technology, and the costs to do it are prohibitive. The control and account data 108 is translated by a magnetic interface application (app) program 111 into a series of encoded flashes 112 that are presented on a display screen 114. Account and operational data 115 are communicated by the series of encoded flashes 112 and includes some or all of the information in the control and account data 108, as well as other information that may need to be inserted by PTD 110.

The Apple iPhone may not presently be able to accurately and precisely sequence encoded flash data to its screen. But this may not be true with Android, and other types of smartphones. The asynchronous communication methods mentioned herein may not be necessary in future. Synchronous communications may be simple to do in other devices, or in the iPhone itself in the near future. As more devices use screen communications, their operating systems will no doubt be improved to accommodate good synchronous communications.

A magnetic interface card 116 is typically laid down by the user right over the display screen 114 to receive the series of encoded flashes 112 with an embedded one-bit photosensor. The flashes presented can be white light. Colors may be used in special applications and color filters can be used in front of the embedded one-bit photosensors to discriminate between applications. Spectral emission amplitude and frequency/color may also be included to assist in a mutual authentication of the PTD-magnetic interface system.

The typical user would not ordinarily see the screen flashes when the magnetic interface card is laid flat on the display screen. A button or some other mechanism can be used to signal the magnetic interface card 116 when it should wake up to accept the optical download. Once a download is completed, magnetic interface card 116 may audibly signal the user and/or the PTD through its microphone that the download succeeded. An encoded audio signal can also be sent to the PTD related to health issues, battery life, etc.

Once loaded, the magnetic interface card 116 becomes completely autonomous and can be used, at least a few times, as an ordinary payment card in a standard merchant magnetic card reader. The security advantage is a stolen magnetic interface card 116 would quickly run out of valid charge numbers and if it were reported stolen quickly those charge numbers that were still unused could be instantly invalidated.

There are at least three operational advantages in having the magnetic interface card 116 laid down flat on the display screen 114 to receive the series of encoded flashes 112 with an embedded one-bit photosensor. The first is that ambient light can be blocked and not allowed to interfere with the embedded one-bit photosensor. The second is only a small spot on the display screen 114 corresponding in position to the embedded one-bit photosensor need be dedicated for use by the series of encoded flashes 112. For example, the emissive area on the display screen 114 can be less than 0.25" square. The third advantage is the series of encoded flashes 112 are not visible to others and cannot be intercepted and misused.

The account and operational data 115 accepted by magnetic interface card 116 is used to build "softcards" that are stored in a non-volatile cache memory. Softcards are virtual credit and payment cards stored in electronic form. Each softcard can represent a particular payment account from VISA, MASTERCARD, AMEX, DISCOVER, etc. Here, each softcard is a one-time-use account, and each can be accompanied by more than enough to last a typical user a few days of shopping. The remaining data is used for various housekeeping chores.

PTD 110 is configured by its magnetic interface application program 111 to translate "softcard" digital data received from an issuer 102 or other source to video that can be presented on display screen 114. For example, live motion can be represented at a conventional thirty frames-per-second (FPS). But the control and account data 108 being translated into account and operational data 115 may require work to synchronize the data with the frame rate by the PTD's operating system (OS). However, overhead processes, multi-tasking, screen graphic drivers limitations, screen "persistence" and capacitive affects can all interfere with efforts to synchronize the display for optical bit-at-a-time reading by magnetic interface card 116.

One solution to such a synchronization work overload problem would be to package data 108 into a MPEG-4 movie file for presentation on display screen 114. Conventional movie files often have their own sync coding sync methods to produce smooth data frame sequences. Another solution is to configure magnetic interface card 116 to be capable of asynchronous serial data reception from display screen 114. The data rate may vary considerably, 10-60 FPS, but the data bit rate within a data frame sequence should be accurately clocked, e.g., within 10-20%. Prototypes that were built transmitted at 30-FPS, and included about twenty-five bits for each frame. These bits had to be accurate within the frame in order to distinguish a digital "1" from a "0".

PTD 110 can add data to the discretionary fields in the magnetic payment card track data to communicate cryptogram version levels, origination of cryptograms, location of download system for cryptograms, MAC address or UUID/UDID address of device used to download cryptograms, etc.

Account and operational data 115 typically includes at least some of the track-1 or track-2 data, and variable data sets or cryptograms that enable use-once card functions. The data transmission from the PTD may also include softcard identifiers in the event the magnetic interface card includes more than a single instance of a payment card type, issuer, card association, or similar. Card types include debit, credit, rewards, loyalty, etc. The card can also assemble data transmitted to the PTD for multiple card types, associations, issuers, debit/credit, etc.

A battery 118 inside magnetic interface card 116 allows preloaded account and operational data 115 to be retained for a reasonable time, and to operate autonomously in several financial transactions with a conventional magnetic-stripe merchant card reader 120. The number of autonomous transactions allowed can be software defined to suit the users or issuers.

An electromagnetic stripe 122 generates a magnetic data readout 124 whenever magnetic interface card 116 is swiped in the merchant card reader 120. Such magnetic data readout 124 will include some data that was originally transmitted in the control and account data 108. Bank 102 can thereafter be queried by the merchant card reader 120 to authenticate the magnetic interface card 116 using the magnetic readout 124 it received.

FIG. 1B represents an alternative payment system embodiment of the present invention that uses near field communications (NFC), and is referred to herein by general reference numeral 130. Here, a PTD 130 includes an NFC transceiver 132 that is used to communicate the account and operational data 115 to the magnetic interface card 116 over an NFC wireless link 134. The advantage of NFC wireless link 134 is it is two-way and the PTD 130 and magnetic interface card 116 can use it to mutually authenticate one another. The operation and use of magnetic interface card 116 is otherwise the same as in FIG. 1A. At present, only a small minority of mobile devices can support NFC, while the vast majority of them have display screens that can be used to support the series of encoded flashes described in FIG. 1A.

FIGS. 2A-2C represent an improved payment system embodiment of the present invention, and is referred to herein by the general reference numeral 200. A bank 202 or other payment card issuer sends precomputed cryptogram tables 204 to a personalization bureau 206. A blank magnetic interface card 208 is loaded with the precomputed cryptogram tables 204 and personalized for specific users before being issued and distributed.

Magnetic interface card 208 includes a electromagnetic stripe 210 with four partial tracks 211-214 divided longitudinally by a gap 216. Partial tracks 211-212 lie in a Track-1 recognized by magnetic card reader 120, for example, and partial tracks 213-213 lie in a Track-2. Any of partial tracks 211-214 can be implemented as conventional magnetic recordings, or implemented with an inductor that emits serially time encoded electro-magnetic fields to mimic those of a conventional magnetic recording being swiped past a read head, e.g., in legacy card reader 120. A pair of swipe detectors 218 and 219 are provided, and can be implemented with piezo-electric sensors. A photosensor 220 is embedded to support the optical communication functions described in FIG. 1A.

Piezo-electric devices when used as sensors can also be used as beepers, giving the card the ability to provide users with audio feedback in the form of beeps. The beeps can be a simple user notification of successful programming, or they can be encoded so a PTD microphone can receive interactive acknowledgements.

An issued magnetic interface card 222 can therefore provide magnetic data 224 that simulates all the static data normally provided in Track-1 and Track-2 of conventional payment cards and is compatible with a legacy magnetic card reader 226. The difference is the inductors can dynamically change the data they transmit to accommodate use-once cryptograms and account numbers that must be changed for every transaction.

In conventional payment cards, magnetic bit data is laid out on a standard electromagnetic stripe in three tracks. A electromagnetic stripe card may have any of these tracks, or a combination of the three tracks. Magnetic interface cards 208 and 222 use only track-1 and track-2.

Track-1 was standardized by the International Air Transportation Association (IATA) and is still reserved for their use. It is 210-bpi with room for seventy-nine 7-bit characters, six data bits plus one parity bit in ASCII. Track-3 may be used for purposes defined by the card associations, the issuers, etc.

TABLE I

Track 1 Fields

| | |
|---|---|
| Start sentinel | 1 byte (the % character) |
| Format code | 1 byte alpha (The standard for financial institutions specifies format code is "B") |

TABLE I-continued

Track 1 Fields

| | |
|---|---|
| Primary Account number | Up to nineteen characters. American Express inserts space characters in here in the same places the digits are broken up on the face of the magnetic interface card. |
| Separator | 1 byte (the ^ character) |
| Country code | 3 bytes, if used. (The United States is 840) This is only used if the account number begins with "59." |
| Surname | |
| Surname separator | (the / character) |
| First name or initial | |
| Space | (when followed by more data) |
| Middle name or initial | |
| Period | (when followed by a title) |
| Title | (when used) |
| Separator | 1 byte (^) |
| Expiration date or separator | 4 bytes (YYMM) or the one byte separator if a - non-expiring card. |
| Discretionary data | Optional data can be encoded here by the issuer. |
| End Sentinel | 1 byte (the ? character) |
| Longitudinal Redundancy Check (LRC) | 1 byte. The LRC is made up of parity bits for each "row" of bytes, making the total even. That means that the total of all the bit ones of each byte has to come out to an even number. Same for bit 2, etc. The LRC's parity bit is not the sum of the parity bits of the message, but only the parity bit for the LRC character itself. (It's odd, just like any other single byte's parity bit.) |

Track 2 was developed by the American Bankers Association (ABA) for on-line financial transactions. It is 75-bpi with room for forty 5-bit numeric characters, four data bits plus one parity bit.

TABLE II

Track-2 Fields

| | |
|---|---|
| Start sentinel | 1 byte (0x0B, or a; in ASCII) |
| Primary Account Number | Up to 19 bytes |
| Separator | 1 byte (0x0D, or an = in ASCII) |
| Country code | 3 bytes, if used. (The United States is 840) This is only used if the account number begins with "59." |
| Expiration date or separator | 4 bytes (YYMM) or the one byte separator if a non-expiring card |
| Discretionary data | Optional data can be encoded here by the issuer. |
| End Sentinel | 1 byte (0x0F, or a ? in ASCII) |
| Longitudinal Redundancy Check (LRC) | 1 byte. |

Track-3 is also occasionally used for financial transactions. The difference is in its ability to read/write. It also is 210-bpi, but with room for one hundred and seven numeric digits. Track 3 is used to store the enciphered PIN, country code, currency units, amount authorized, subsidiary account information, and other account restrictions. Track-3 has the same properties as track-1, e.g., start and end sentinels and an LRC byte. But there is no standard for the data content or format. Track-3 is not currently used by any national bank card issuer, but could be used in any of the embodiments of the present invention described here.

Electromagnetic stripe 122 can be employed in credit cards, time and attendance, personnel identification, ATM cards, bank cards (credit and debit cards including VISA and MasterCard), gift cards, loyalty cards, driver's licenses, telephone calling cards, membership cards, electronic benefit transfer cards, and other applications. Examples of cards which intentionally ignore ISO standards include hotel key cards, most subway and bus cards, and some national prepaid calling cards in which the balance is stored and maintained directly on the stripe and not retrieved from a remote database.

There are two types of static magnetic encoding materials standards, high-coercivity (HiCo) at 4000 Oe, and low-coercivity (LoCo) at 300 Oe but it is not unusual to have intermediate values at 2750 Oe. Coercivity is the measure of magnetic intensity that must be applied to a material to remove the residual magnetism when it has been magnetized to saturation. A magnetic interface card encoded with high-coercivity is less at risk of being accidentally erased than a low-coercivity encoded card. Most card systems support both types of media, but high-coercivity is generally recommended, especially for ID badges.

In practical terms, low coercivity electromagnetic stripes are usually a light brown color, and high coercivity stripes are nearly black. Exceptions include a proprietary silver-colored formulation on transparent American Express cards. High coercivity stripes are resistant to damage from most magnets likely to be owned by consumers. Low coercivity stripes are easily damaged by even a brief contact, e.g., with a magnetic purse strap or fastener. Virtually all bank cards are therefore encoded with high coercivity stripes despite the slightly higher cost per unit.

FIG. 3 represents a financial payment system 300, in an embodiment of the present invention. It provides strong authentication of a user and their payment during a financial transaction. At a card issuing bank, association, or trusted service manager, an account number from a generator 302, an expiry date 304, and a sequence number from a generator 306 are grouped into tables. Symmetric encryption 308 and a secret key 310 are used to build cryptogram tables 311-315 for corresponding individual user magnetic interface cards 321-325. These can include full or partial data, and are communicated with NFC, optically, by audio tones, or a feature connector cable.

For example, when a particular individual user magnetic interface card 325 is used in successive financial transactions with a merchant, a card swipe 326 by a legacy card reader 328 will sequentially collect use-once, non-predictable table values 331-334. A particular use-once, non-predictable table value 331, for example, will be forwarded to a merchant point-of-sale (POS) terminal 340. A second authentication factor 342 may be collected, such as a personal identification number (PIN) or card verification value (CVV2) that would only be known to the user or someone actually in possession of magnetic interface card 325. An electronic request 344 is forwarded to a payment processor 346 for transaction authorization. The particular use-once, non-predictable table value 331 is forwarded in a message 348 for symmetric decryption 350 using what should be secret key 310. The decryption will reconstruction the user account number, the expiry, and the sequence number. Tests 352, 354, and 356 check that these are correct, or within expected bounds. A transaction approval decision 358 is formulated. An approval depends on a check 360 of the second authentication factor 342. A signal 362 is returned as a reply 364 to the POS terminal 340.

Figure 4:
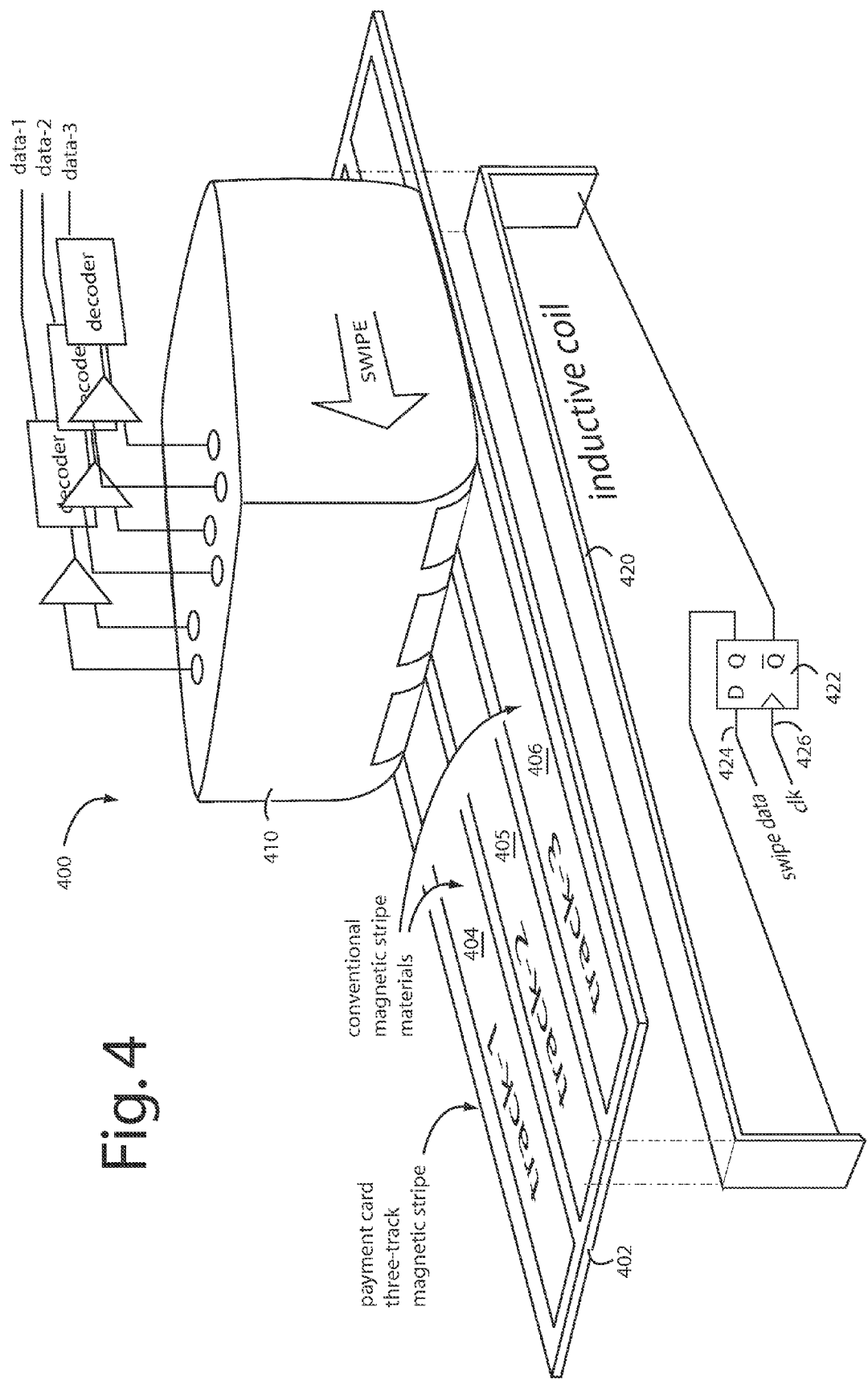
FIG. 4 is a perspective diagram showing how an inductive coil can be placed under the track-2 area of a electromagnetic stripe and read by a legacy card reader.

FIG. 4 represents a magnetic data reading system 400, in an embodiment of the present invention. A electromagnetic stripe 402 is similar to electromagnetic stripes 122 (FIGS. 1A-1B), 210 (FIG. 2B), and on magnetic interface cards 321-325 (FIG. 3). There are three magnetic data tracks, track-1 404, track-2 405, and track-3 406, similar to tracks 211-214 in FIG. 2B. Tracks 404 and 406 are conventional, track-2 405 is one embodiment of the present invention. A read head 410 is conventional and is a usual part of a legacy card reader, such as 120 in FIGS. 1A-1B, 2A, and 3.

Static magnetic bits are defined with two sub-intervals, the clock and the data sub-interval. The static magnetic stripe data is oriented in North-South sub-intervals to signify transitions from one sub-interval to another. It is these transitions that are decoded by the POS read head. The embodiments herein rely on the ability of the POS read head to distinguish sub-interval transitions. Either by the changing flux fields via North-South magnetic pole switching, or by an emissive coil producing a square wave that emulates these transitions. The transitions are not required to be zero-crossing. They only need to be inductively coupled to the head for a period of time, followed by a reduction of the head flux to nearly zero.

A deposited-film inductive coil 420 is shown highly simplified in FIG. 4, and is driven by a logic device 422 used as a driver. When a swipe of read head 410 on electromagnetic stripe 402 is detected, a swipe data signal 424 and a bit rate clock 426 will commence. The result will be to spoof read head 410 into accepting track-2 405 data that appears to be conventional. Of course, inductive coils could also be used under either or both of track-1 404 and track-3 406.

Figure 5A:
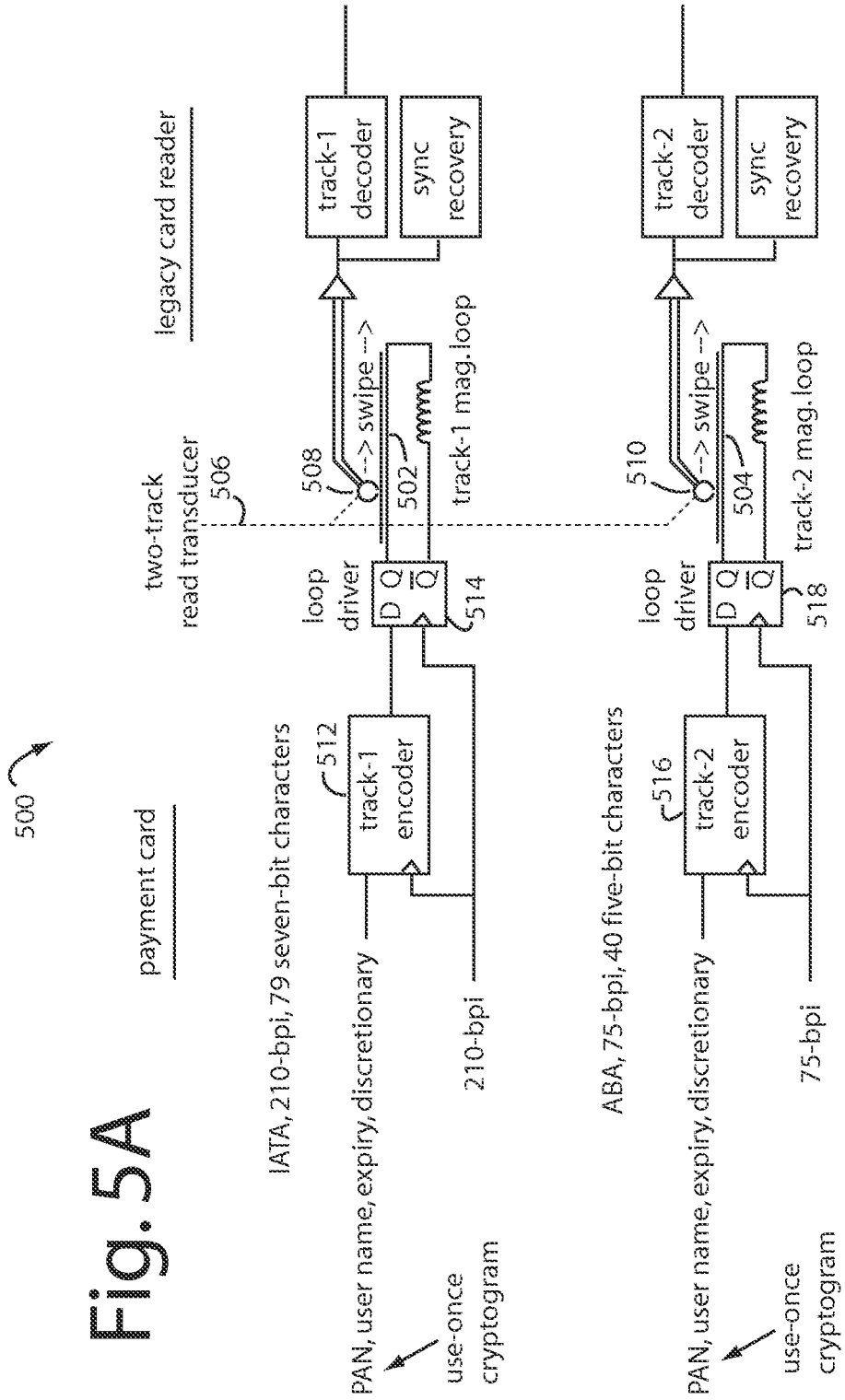
FIG. 5A is a schematic diagram of a two track implementation of inductive coils placed under the track-1 and track-2 areas of a electromagnetic stripe and read by a legacy card reader.

FIG. 5A represents a fully dynamic two track configuration 500, in an embodiment of the present invention that places two fully emissive inductive loops 502 and 504 side-by-side in tracks-1 and track-2 in a electromagnetic stripe mounted on a magnetic interface card. A two-track read transducer 506 in a conventional legacy card reader has a first gap 508 that reads track-1 502, and a second gap 510 that reads track-2 504. A track-1 encoder 512 formats a serial digital stream for loop driver 514 that conforms to IATA, 210-bpi, 79 seven-bit character standards. A track-2 encoder 516 formats a serial digital stream for loop driver 518 that conforms to ABA, 75-bpi, 40 five-bit character standards.

Figure 5B:
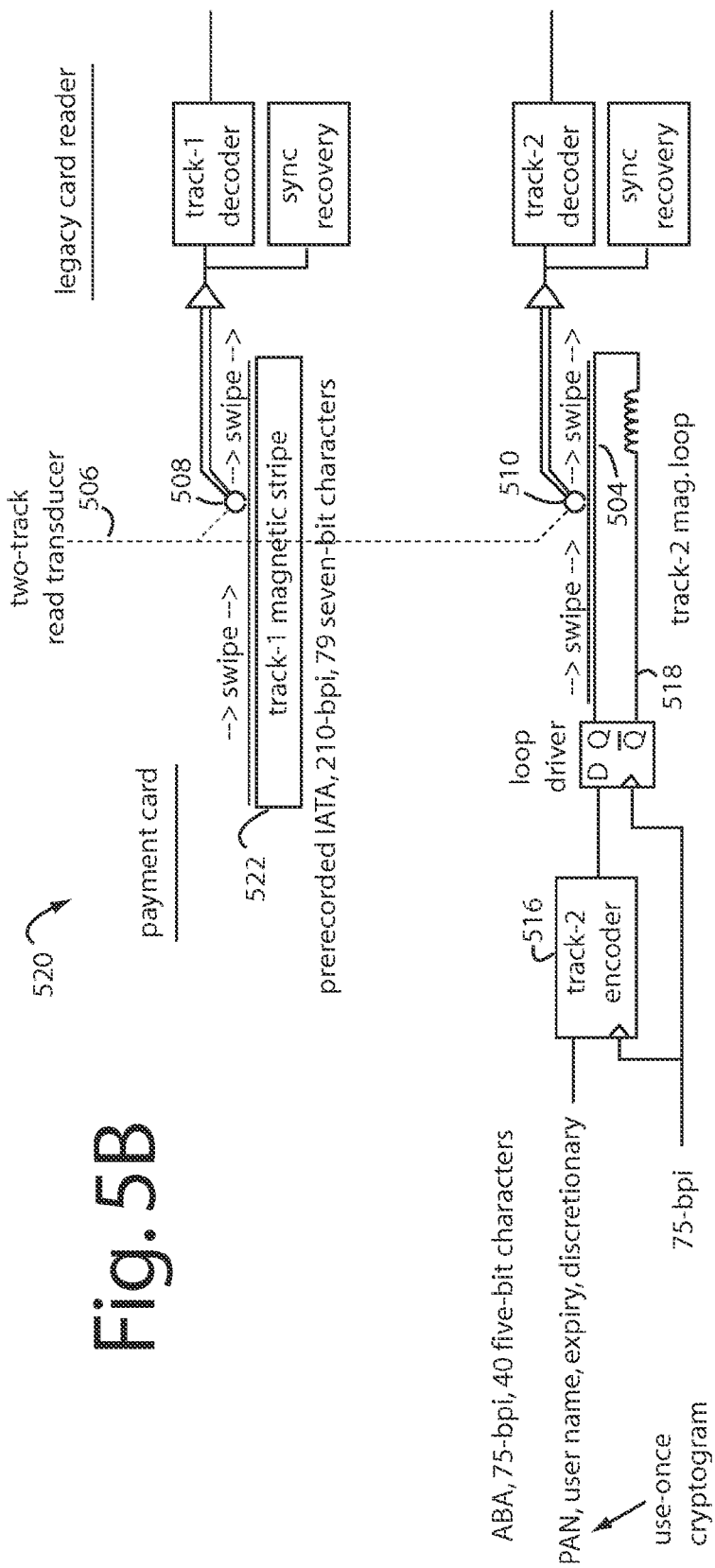
FIG. 5B is a schematic diagram of a two track implementation of a conventional magnetic data track and an inductive coil placed under the track-1 and track-2 areas of a electromagnetic stripe and read by a legacy card reader.

FIG. 5B represents a mixed conventional track-1 and a fully dynamic track-2 configuration 520, in an embodiment of the present invention that places fully emissive inductive loop 504 alongside a conventional track-1 in a electromagnetic stripe mounted on a magnetic interface card. A conventional two-track read transducer 506 in a legacy card reader has a first gap 508 that reads track-1 522, and a second gap 510 that reads track-2 504. As in FIG. 5A, track-2 encoder 516 formats a serial digital stream for loop driver 518 that conforms to ABA, 75-bpi, 40 five-bit character standards.

Figure 5C:
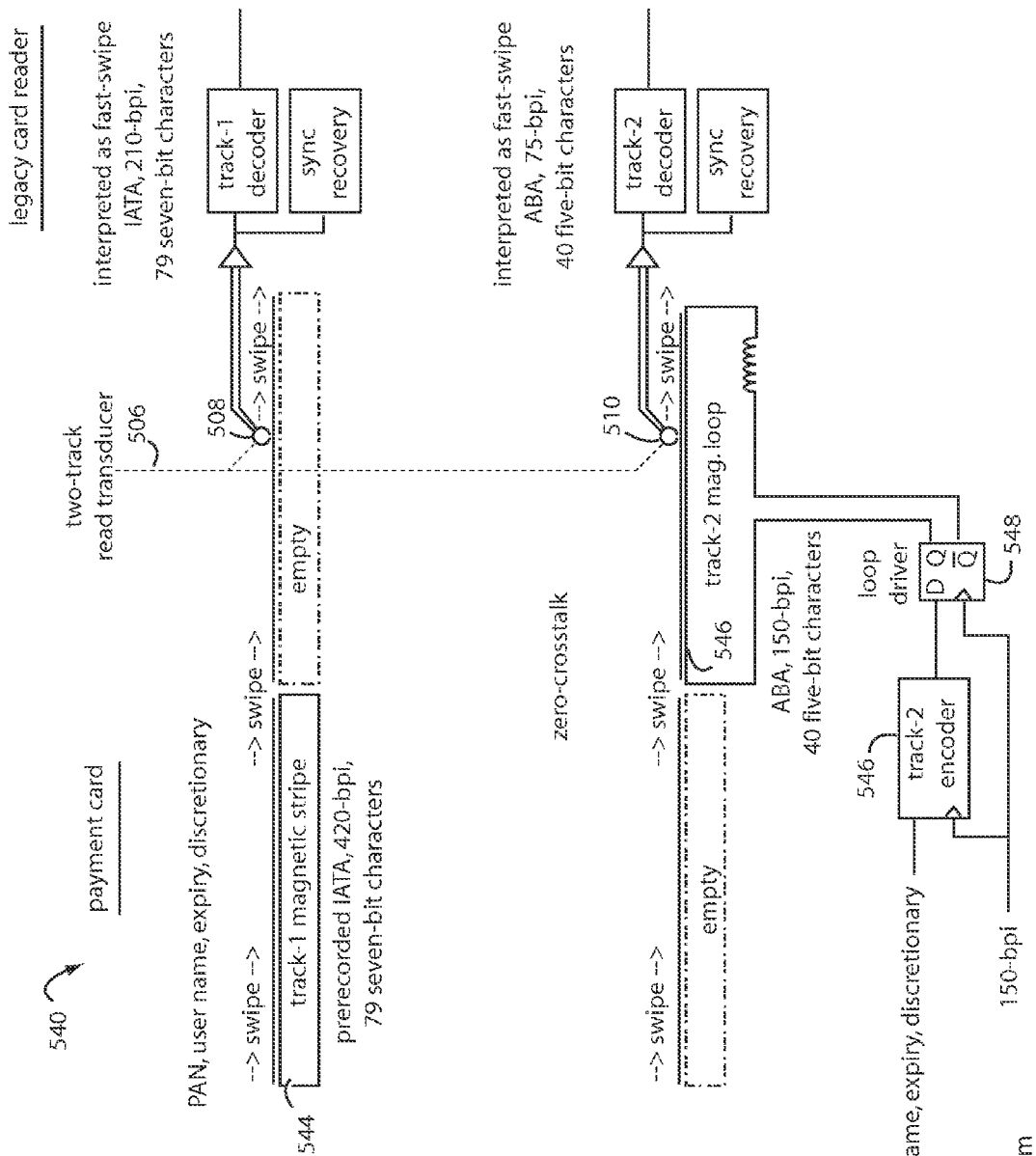
FIG. 5C is a schematic diagram of a two track implementation of a conventional magnetic data track and an inductive coil placed under partial track track-1 and track-2 areas of a electromagnetic stripe and read by a legacy card reader.

FIG. 5C represents a reduced channel cross talk configuration 540, in an embodiment of the present invention that staggers a fully emissive track-1 inductive loop 542 with respect to a foreshortened, but otherwise conventional track-2 in a magnetic stripe mounted on a magnetic interface card. In the context of FIG. 2B, these would be partial tracks 214 and 211, respectively. As before, conventional two-track read transducer 506 in a legacy card reader has a first gap 508 that reads track-1 544, and a second gap 510 that reads track-2 546. A track-2 encoder 546 formats a serial digital stream for loop driver 548 that conforms to ABA, 40 five-bit character standards, but at a square wave frequency of up to 15 kbps. Inductively coupled emissive data does not have to conform to a standard BPI level, since most POS readers accept data rates up, and even beyond, 7-kps. For this reason, the emissive element active area can remain short. When an emissive element is placed under a permanently recorded magnetic stripe, its length must be as long as the data recording length or have means to interface static magnetic data with the dynamic emissive data start and end points.

Industry standard card body sizes are 3.375" long by 2.125" wide by about 0.031" thick. ISO Standard 7810 relates to the Physical characteristics of credit card size document; 7811-1 Embossing; 7811-2 Electromagnetic stripe-low coercivity; 7811-3 Location of embossed characters; 7811-4 Location of tracks 1 & 2; 7811-5 Location of track 3; 7811-6 Electromagnetic stripe-high coercivity; and, 7813 Financial transaction cards.

Figure 6:
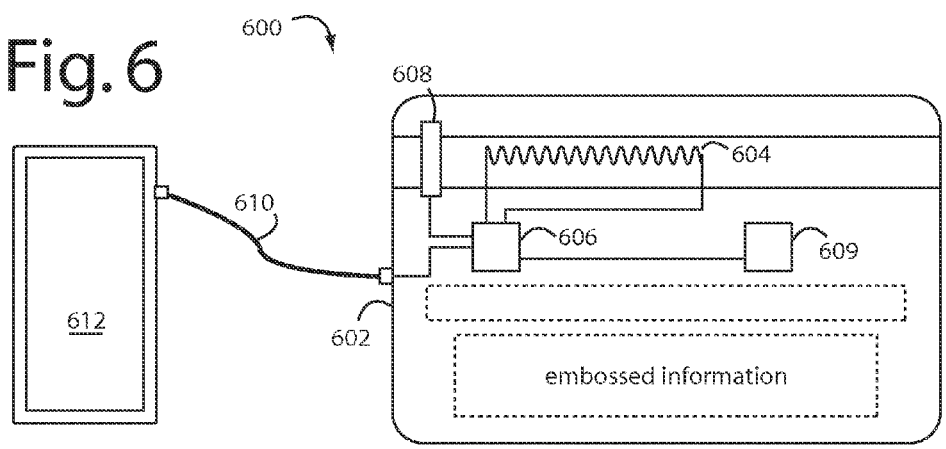
FIG. 6 is a functional block diagram of an access card embodiment of the present invention with an emissive coil element.

FIG. 6 represents an access card 600 that includes a card body 602 with an emissive element 604, electronic signal conditioners 606, a swipe sensor 608, and audio output device 609 for user or PTD communications, and a cable 610 that is attached as a peripheral to a mobile device 612.

Audio output device 609 is used in many embodiments of the present invention for sounding out feedback data in tones and/or indicating a process within the magnetic interface card has concluded. For example, it may be included in the access cards described in FIGS. 7-8 as well.

No battery or PIC is ordinarily needed in peripheral access card 600 since it relies on the mobile device 612 to do decryption and security management and to output an audio signal with coded pulses that can be signal conditioned and directly introduced for reading through the emissive element 604 by a legacy card reader. The access card 600 is a thin-client, and simply an interface device to a legacy card reader in a compatible card format. The emissive element 604 can be a deposited-film inductive coil with predefined intra-track and inter-track spacings that correspond to particular data recording tracks, and that have zero persistence after a transfer of data.

Figure 7:
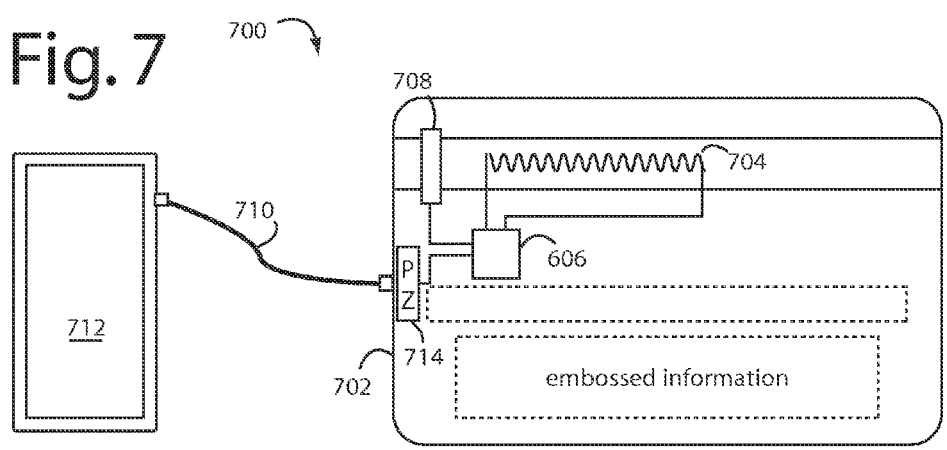
FIG. 7 is a functional block diagram of a thin-client access card embodiment of the present invention with an emissive coil element with an acoustic modem and piezoelectric device.

FIG. 7 represents an access card 700 that includes a card body 702 with an emissive element 704, electronic signal conditioners 706, a swipe sensor 708, and an acoustic modem 710 that couples to an earphone or speaker of a mobile device 712. A battery wouldn't be needed if a piezo-electric battery-generator 714 were included in peripheral access card 700. Mobile device 712 could also be relied on to do decryption and security management.

Figure 8:
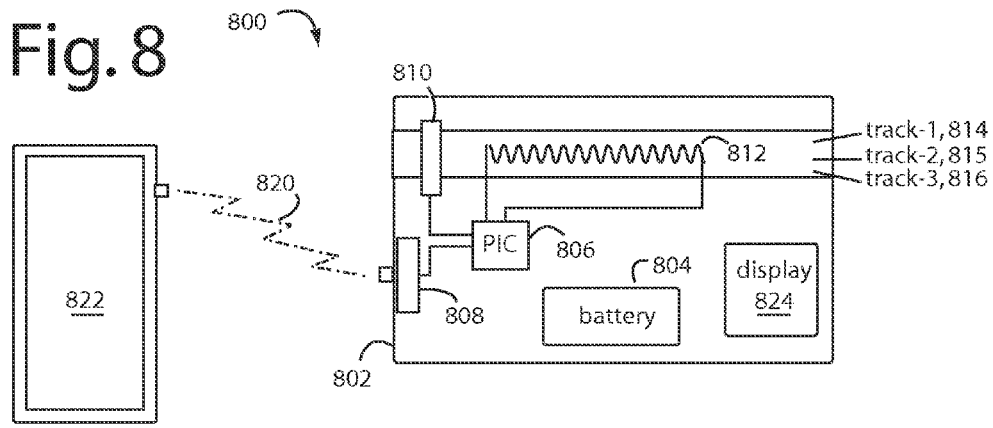
FIG. 8 is a functional block diagram of autonomous access card embodiment of the present invention with an emissive coil element and a display.

FIG. 8 represents a magnetic interface card 800 with a card body 802, a battery 804, a microcontroller or peripheral interface controller (PIC) 806 with a cryptogram storage, a photosensor 808, a pair of swipe sensors 810, and an inductive element 812. PIC 806 can be a PIC1650 by Microchip Technology (Chandler, Ariz.). Inductive element 812 magnetically couples to a merchant POS card reader, via one, two, or all three magnetic tracks 814-816. The three tracks 814-816 are formatted as ABA, IATA, and a proprietary track. The IATA track can be an ISO or ANSI track, according to bank association and issuer requirements.

Magnetic interface card 800 implements all the magnetic bit elements as programmable and dynamic on either or both of track-1 and track-2. A one-way optical link 820 uses light flashes to download encoded credit and payment "softcards" from a mobile personal trusted device 822. Such light flashes can be monochromatic, visible, or infrared (IR) type light, but will usually consist of the ordinary light produced by a color cellphone display screen. Magnetic interface card 800 can further include a digital display 824 to show coupons, personal information, authentication tokens for online usage, etc.

Access card 800 is an independent autonomous card that can be used for up to three years in the field, and has dynamic data elements, similar to those previously described by the present inventor, Kerry D. Brown in various issued United States Patents and published Patent Applications.

When a softcard in a cache within a magnetic interface card is used, the issuer is notified of its use through the transaction processing network. An alert may be returned to the PTD to the user if their cache of softcards is running low. The user or issuer/association may decide, e.g., in a softcard application settings menu, to maintain the cache of softcards either in the PTD and/or the magnetic interface card. Alternatively, the user can be required to request of a new softcard number for each transaction.

Having fewer softcard numbers stored in the magnetic interface card improves security because fewer unauthorized transactions of a misused or stolen card would be possible. Fewer softcard numbers stored means more frequent PTD authentications and log-ins would occur, increasing security. Card usage notifications may be returned just prior to battery expiration, along with other card maintenance and monitoring data.

Store loyalty cards, such as Macy's, Bloomingdales, etc., that are promoted by merchants to buyers of merchandise can be maintained for the magnetic interface card. A merchant/clerk will ask if the buyer would like to apply to a loyalty card with some percentage discount on their present purchase. They will be advised they can log on to a certain site, perhaps transmitted to their phone by SMS from the clerk/merchant, and a loyalty app (Bloomingdale's, Macy's, etc.) will be loaded onto their PTD. The softcard data will be sent when their application is approved, and loyalty coupons will be managed by the app. The user/owner/buyer will also be advised of loyalty partner programs, and may be given a magnetic interface card when their application is approved. The magnetic interface card may be cobranded (Sears and Visa), or loyalty partner branded (Macy's and their partner group), or just be a PayPal account with multiple links to cards registered with PayPal (e.g. Visa debit, MC credit, AMEX credit, etc.). The novelty is that you can now register multiple cards with PayPal for use on the magnetic interface card, which in and of itself is agnostic. Each magnetic interface card assembles the PTD data with the corresponding card types registered in the within.

The piezo-electric swipe sensors 218 and 219 (FIG. 2C) can be configured to do double duty as miniature speakers so the magnetic interface card can be made to "beep", e.g., when it has completed being programmed by the PTD 110. PTD 110 can be configured to beep/vibrate when a programming cycle is complete. For example, to provide the user and/or the PTD microphone with an audio indication an operation has completed or was successful.

A magnetic interface card is "programmed" using various pieces of softcard data that must be forwarded by the PTD. The PTD receives important parts of account data from the issuer/card association/cloud/TSM/etc. The data is assembled and check-summed. Each card must be matched to its user, and the corresponding PTD. Someone else's PTD and its softcard data cannot be high-jacked on the magnetic interface card, thus providing a low-level form of mutual authentication.

An alternative version of the magnetic interface card configured for merchants stores no data at all. If a user with the right application on their own PTD needs to, they can use the merchants card for temporary transactions on the magnetic swipe POS. The advantage is similar to signing up people for credit cards at Sears, or other stores, at the time of purchase. The merchant may offer 5% discount if they sign up for the Sears PTD card application. They could then receive authorization to download the app, the newly issued Sears softcard, and make a purchase at the terminal.

The potential marketing opportunities for the PTD application and this novel card are along the same lines as present marketing operations for promoting branded credit cards. The magnetic interface card can automatically clear itself of any stored partial softcard data when an attempt to program it by another PTD is made.

Magnetic interface cards are extensions of mobile PTD eWallet applications. The PTD offers receipts for purchases, purchase notifications, coupon/groupon storage, web-based purchase capability (Amazon, etc.), OTP number generation, a screen for display (hence no need for a display on the magnetic interface card, at least in the primary embodiment), and a host of features that an interface card, or normal payment card, can't offer.

A PTD in combination with a magnetic interface card can be used at any magnetic-swipe POS. Embodiments with the optical interfaces to the magnetic interface card, and that use partial softcard data, provide better security than an NFC type. The data sent by PTD's to their respective magnetic interface cards is only partial data to a parsed dynamic/cryptogram.

A fraudster can press an NFC terminal up against a wallet to surreptitiously acquire transaction data. NFC uses radio frequency (RF) signals that are suspected to be harmful. Optical programming interfaces use no RF.

Piezo-crystal elements can be used for the swipe detectors, but other devices and methods can be used as well. One novel method discriminates a real card swipe from other kinds of vibrations, card flexing, and other "noise". Two swipe sensor crystal elements are connected to a basic full-wave diode bridge to rectify their outputs. The output signals from the bridge are input into a microcontroller to sense physical activity. Common mode vibrations like hitting, dropping, sitting on the magnetic interface card, etc., would result in both piezo crystals generating similar voltages, resulting in a nulling out of their common-mode vibrations. A strong signal from one piezo crystal, and a weak/no voltage from the other crystal would produce a high differential voltage. When the amplitude exceeds a threshold, a trigger to a state-machine causes softcard data, for example, to be transmitted to the magnetic emissive element.

Piezo-electric crystals may be used as swipe detectors and also as an audible communication device for the user and the PTD. It, or another audible device, can be used to provide the closed loop system feedback, e.g., from issuer to the PTD, to the card, and back to PTD and issuer. Such feedback can be very important and used to validate the entire system security.

An advantage of the present embodiment in using optical transmission is that it is not susceptible to surreptitious acquisition or interrogation typical of NFC cards. The magnetic interface card will not be "awake" until it is swiped, or a swipe sensor is pressed. By pressing the magnetic interface card against the screen of a PTD, the magnetic interface card will first transmit data, and then it will "look" for optical communications within a certain period of time, receive any data, and then go back to sleep. The optical emissions must be within a certain intensity and baud rate, and filters can be used for spectral discrimination.

In general, embodiments of the present invention include both device and system applications. The magnetic interface cards are fairly "dumb" interfaces, e.g., between a powerful smartphone and more than forty million magnetic swipe terminals throughout the world. Each interface card acts as an extension of the smartphone, to bring to bear all the great financial applications available on smartphones and not available to unmodified POS terminals. The magnetic interface cards can communicate to the user with tones, beeps or even synthesized stored voice statements. These are receivable by smartphones via their built-in microphones.

A smartphone app can be included to program the magnetic interface card and to "listen" for encoded tones, or synthesized voices. It can be used to acknowledge successful data communications, maintenance, monitoring data, battery condition, etc.

Although particular embodiments of the present invention have been described and illustrated, such is not intended to limit the invention. Modifications and changes will no doubt become apparent to those skilled in the art, and it is intended that the invention only be limited by the scope of the appended claims.

The invention claimed is:

1. An improved payment card system for remotely supporting personal trusted devices (PTD) capable of secure connections and a population of magnetic interface cards each with a card body, an electromagnetic stripe, and a magnetic data track, comprising:
  a financial transaction server configured for network connections;
  a host program for execution by the financial transaction server for supporting financial transactions between users and merchants;
  the improvement comprising:
    an application program for execution by each of the PTDs that provides for authentication and secure connections with the financial transaction server over a network and that are configured to output of a series of encoded display screen flashes that embed account security data related to particular users;
    a magnetic emissive element disposed in each card body near the magnetic data track that is configured to periodically output track data for legacy point-of-sale payment card readers;
    an optical receiver in each magnetic interface card that is configured to accept a series of encoded display screen flashes with account security data embedded in them from the financial transaction server and that can enable the magnetic interface card to output authentic magnetic payment account information;
    a processor included in each magnetic interface card that provides for the translation of information provided by the financial transaction server via the optical receiver into formatted data for the magnetic emissive element;
    the PTDs configured to receive softcard data over the network from a card issuer or association;
    an optical device included in the PTDs and configured to transmit encoded optical flashes;
    an audio output device and a smartphone app included in the PTDs and configured to transmit tones for reception by the magnetic interface card which is configured to listen for encoded tones or synthesized voices, and to acknowledge successful data communications, maintenance messages, monitoring data, and battery condition;
    the magnetic interface cards configured to periodically associate with the PTDs to exchange encoded data, and configured to receive optically encoded flashes from the PTDs, and to deliver softcard magnetic account data to a merchant point-of-sale (POS) card reader and terminal;
    wherein, the magnetic interface cards are further configured to provide audio acknowledgements.

2. The payment card system of claim 1, wherein:
the PTDs include a near field communication transceiver; and
each magnetic interface card includes a near field communication transceiver.

3. The payment card system of claim 2, wherein:
The PTDs' near field communication transceiver is configured to communicate account and operational data to the magnetic interface cards' near field communication transceiver.

4. The payment card system of claim 3, wherein:
the PTDs' near field communication transceiver is configured to establish a two-way link with the magnetic interface cards' near field communication transceiver.

5. The payment card system of claim 3, wherein:
the PTDs' near field communication transceiver is configured to authenticate the magnetic interface cards' near field communication transceiver and the magnetic interface cards' near field communication transceiver is configured to authenticate the PTDs' near field communication transceiver.

6. The payment card system of claim 1, wherein:
the network is selected from the group consisting of Wi-Fi networks, 3G networks, and 4G networks.

* * * * *